(12) United States Patent
Bhaumik et al.

(10) Patent No.: US 12,254,507 B2
(45) Date of Patent: Mar. 18, 2025

(54) SYSTEMS AND METHODS OF TARGETED INTERACTIONS FOR INTEGRATED RETAIL APPLICATIONS

(71) Applicant: TRANSFORM SR BRANDS LLC, Hoffman Estates, IL (US)

(72) Inventors: Vijan Bhaumik, Schaumburg, IL (US); Richard Kevin Lyons, Lake in the Hills, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 18/134,974

(22) Filed: Apr. 14, 2023

(65) Prior Publication Data

US 2023/0260010 A1    Aug. 17, 2023

Related U.S. Application Data

(63) Continuation of application No. 16/889,940, filed on Jun. 2, 2020, now Pat. No. 11,669,888, which is a
(Continued)

(51) Int. Cl.
*G06Q 30/0601*    (2023.01)
*G06F 3/01*    (2006.01)
(Continued)

(52) U.S. Cl.
CPC .......... *G06Q 30/0641* (2013.01); *G06F 3/01* (2013.01); *G06F 3/048* (2013.01); *G06Q 30/0237* (2013.01)

(58) Field of Classification Search
CPC .. G06Q 30/0641; G06Q 30/0237; G06F 3/01; G06F 3/048
See application file for complete search history.

(56) References Cited

U.S. PATENT DOCUMENTS 6,129,274 A    10/2000   Suzuki
8,136,724 B1 *  3/2012   Aidasani ............ G06Q 20/4012
                                                        235/379
(Continued)

FOREIGN PATENT DOCUMENTS

EP    2605535 A1 *  6/2013   ........... G06F 1/1684
JP    2003242401 A  *  8/2003
(Continued)

OTHER PUBLICATIONS

My Bui, "When Kiosk Retailing intimidates Shoppers: Howe Gender Focused Advertising Can Mitigate the Perceived Risks of the Unfamiliar", published by Journal of Advertising Research, Sep. 2012, all pages (Year: 2012).*
(Continued)

*Primary Examiner* — Omar Zeroual
(74) *Attorney, Agent, or Firm* — McAndrews, Held & Malloy, Ltd.

(57) ABSTRACT

Example gesture based cross-channel commerce retail systems and methods are provided. Some of the example systems and methods permit a consumer to complete a Store Pick Up order, i.e., an order placed by the consumer via computer, mobile device, telephone, fax, mail-order, etc., by gesturing with a mobile device near a digital kiosk and optical sensor at a store pick up location. The mobile device and/or the digital kiosk may display media content to the consumer while the consumer completes the Store Pick Up order. In another example system, a digital kiosk is located in a public area such as an airport, shopping mall, train station, or stadium. The digital kiosk displays media content to the consumer, and the consumer may transfer to a mobile device such media by gesturing with the mobile device near the digital kiosk.

19 Claims, 5 Drawing Sheets

Related U.S. Application Data continuation of application No. 15/968,271, filed on May 1, 2018, now Pat. No. 10,672,065, which is a continuation of application No. 13/547,910, filed on Jul. 12, 2012, now Pat. No. 9,959,567.

(51) Int. Cl.
*G06F 3/048* (2013.01)
*G06Q 30/0207* (2023.01)

(56) References Cited

U.S. PATENT DOCUMENTS

| | | | |
|---|---|---|---|
| 9,959,567 B2 | 5/2018 | Bhaumik | |
| 10,672,065 B2 | 6/2020 | Bhaumik | |
| 2003/0046166 A1* | 3/2003 | Liebman | G06Q 30/06 705/15 |
| 2003/0074259 A1* | 4/2003 | Slyman, Jr. | G06Q 30/0221 705/17 |
| 2006/0200381 A1* | 9/2006 | Elkholy | G06Q 30/02 705/14.61 |
| 2006/0269264 A1* | 11/2006 | Stafford | H04N 23/695 348/E5.043 |
| 2007/0050240 A1* | 3/2007 | Belani | G08G 1/14 705/13 |
| 2007/0106539 A1* | 5/2007 | Gay | G07G 1/12 705/4 |
| 2007/0138268 A1* | 6/2007 | Tuchman | G06Q 30/06 235/383 |
| 2007/0143127 A1* | 6/2007 | Dodd | G06Q 10/02 705/5 |
| 2007/0188323 A1* | 8/2007 | Sinclair | G06F 3/017 340/568.1 |
| 2007/0213045 A1* | 9/2007 | Hermansson | G06F 1/1698 455/425 |
| 2007/0250383 A1* | 10/2007 | Tollinger | G06Q 30/0255 705/14.66 |
| 2008/0011825 A1* | 1/2008 | Giordano | G06Q 20/04 235/383 |
| 2008/0082424 A1* | 4/2008 | Walton | G06Q 30/0601 705/26.1 |
| 2008/0126260 A1* | 5/2008 | Cox | G06Q 20/3552 705/67 |
| 2008/0195523 A1* | 8/2008 | Rabenold | G06Q 40/04 705/37 |
| 2008/0255901 A1* | 10/2008 | Carroll | G06Q 30/0241 705/1.1 |
| 2009/0191811 A1* | 7/2009 | Griffin | H04L 67/04 455/41.1 |
| 2009/0228325 A1* | 9/2009 | Simmons | G06Q 30/0201 705/7.23 |
| 2010/0057563 A1* | 3/2010 | Rauber | H04N 21/6131 715/772 |
| 2010/0057612 A1* | 3/2010 | Wagenhals | G06Q 20/20 705/40 |
| 2010/0211503 A1* | 8/2010 | Reiss | G06Q 20/40 705/35 |
| 2010/0222026 A1* | 9/2010 | Dragt | H04L 51/18 705/14.1 |
| 2010/0223120 A1* | 9/2010 | Dragt | G06Q 30/0269 705/14.27 |
| 2010/0235253 A1 | 9/2010 | Pikas | |
| 2010/0257033 A1* | 10/2010 | Roberts | G06Q 30/0229 705/14.3 |
| 2010/0268792 A1* | 10/2010 | Butler | G06Q 30/02 715/810 |
| 2010/0306068 A1* | 12/2010 | Sakamoto | G06Q 50/12 705/15 |
| 2010/0312635 A1* | 12/2010 | Cervenka | G06Q 30/06 705/14.1 |
| 2011/0029777 A1* | 2/2011 | Murakami | H04L 67/04 713/171 |
| 2011/0047162 A1* | 2/2011 | Brindisi | G06Q 30/0641 707/E17.09 |
| 2011/0125566 A1 | 5/2011 | McLaughlin | |
| 2011/0187642 A1* | 8/2011 | Faith | G06Q 20/3224 345/158 |
| 2011/0191237 A1* | 8/2011 | Faith | G06Q 20/40 705/1.1 |
| 2011/0288938 A1* | 11/2011 | Cook | G08B 13/1427 705/14.66 |
| 2012/0022930 A1* | 1/2012 | Brouhard | G06Q 30/0229 705/14.3 |
| 2012/0022944 A1* | 1/2012 | Volpi | G06Q 30/0207 705/14.1 |
| 2012/0029691 A1* | 2/2012 | Mockus | G07F 9/023 700/231 |
| 2012/0072311 A1* | 3/2012 | Khan | G06Q 30/0635 705/26.81 |
| 2012/0084138 A1* | 4/2012 | Anantha | G06Q 30/0241 705/14.69 |
| 2012/0089451 A1* | 4/2012 | Agramonte | G06Q 30/0237 705/14.1 |
| 2012/0130810 A1* | 5/2012 | Kilgore | G06Q 30/0251 705/14.49 |
| 2012/0150601 A1* | 6/2012 | Fisher | H04B 5/70 705/14.23 |
| 2012/0160912 A1* | 6/2012 | Laracey | H04W 12/069 235/379 |
| 2012/0164990 A1* | 6/2012 | Amora | G06Q 10/02 455/414.1 |
| 2012/0203572 A1* | 8/2012 | Christensen | G06Q 30/02 705/2 |
| 2012/0315848 A1* | 12/2012 | Smith | H04B 5/72 455/41.1 |
| 2013/0017884 A1* | 1/2013 | Price | G07F 17/3225 463/25 |
| 2013/0076645 A1* | 3/2013 | Anantha | G06F 3/0488 345/173 |
| 2013/0097080 A1* | 4/2013 | Smets | G06T 1/20 705/44 |
| 2013/0130614 A1* | 5/2013 | Busch-Sorensen | G06K 19/07336 455/1 |
| 2013/0262719 A1* | 10/2013 | Suggs | H04L 67/306 710/62 |
| 2013/0290096 A1* | 10/2013 | Lizotte, III | G06Q 30/0246 705/14.45 |
| 2013/0303263 A1* | 11/2013 | LeMay | G07F 17/3223 463/25 |
| 2013/0325620 A1* | 12/2013 | Walker | G06Q 30/0623 705/14.64 |
| 2014/0019377 A1* | 1/2014 | Bhaumik | G06F 3/01 705/339 |
| 2014/0055265 A1* | 2/2014 | Berger | G06F 21/74 340/568.1 |
| 2014/0100942 A1* | 4/2014 | Konevic | H04L 67/34 705/14.37 |
| 2014/0162598 A1* | 6/2014 | Villa-Real | G07F 7/0886 455/411 |

FOREIGN PATENT DOCUMENTS

| | | | | |
|---|---|---|---|---|
| JP | 2006301807 A | * | 11/2006 | |
| JP | 2007226591 A | * | 9/2007 | |
| JP | 4696966 B2 | * | 6/2011 | |
| KR | 2002077749 A | * | 10/2002 | |
| KR | 2009001650 A | * | 1/2009 | |
| KR | 2013058097 A | * | 6/2013 | |
| WO | 0070504 | | 11/2000 | |
| WO | WO-0070504 A2 | * | 11/2000 | G06F 16/9535 |
| WO | 2007041597 | | 4/2007 | |
| WO | WO-2007041597 A2 | * | 4/2007 | G06Q 30/02 |
| WO | 2008049068 | | 4/2008 | |
| WO | WO-2008049068 A2 | * | 4/2008 | A61B 5/0002 |
| WO | WO-2012002716 A2 | * | 1/2012 | G06F 3/0346 |

(56) References Cited

FOREIGN PATENT DOCUMENTS

WO         2015038211        3/2015
WO     WO-2016201009 A1 * 12/2016   .......... A47F 3/0434

OTHER PUBLICATIONS

My Bui, "When Kiosk Retailing intimidates Shoppers: Howe Gender Focused Advertising Can Mitigate the Perceived Risks of the Unfamiliar", published by Journal of Advertising Research, Sep. 2012 (Year: 2012).*

Int'l Preliminary Report on Patentability No. PCT/US2013/048922 mailed Jan. 22, 2015. (7 pages).

Jennifer Rowley, "Kiosks 21: a New Role for Information Kiosks?", 2002, International Journal of Information Management, pp. 67-83 (17 pages).

Int'l Search Report and Written Opinion AppIn No. PCT/US2013/048922 mailed Nov. 5, 2013. (15 pages).

My Bui, "When Kiosk Retailing Intimidates Shoppers: How Gender Focused Advertising Can Mitigate the Perceived Risks of the Unfamiliar", published by Journal of Advertising Research, Sep. 2012 (Year: 2012).

* cited by examiner

SYSTEMS AND METHODS OF TARGETED INTERACTIONS FOR INTEGRATED RETAIL APPLICATIONS

The present application is a continuation of U.S. application Ser. No. 16/889,940, filed Jun. 2, 2020, which is a continuation of U.S. application Ser. No. 15/968,271, filed May 1, 2018 (U.S. Pat. No. 10,672,065), which is a continuation of U.S. application Ser. No. 13/547,910, filed Jul. 12, 2012 (U.S. Pat. No. 9,959,567). The aforementioned documents are hereby incorporated herein by reference in their entirety.

FIELD OF THE DISCLOSURE

The present disclosure generally relates to cross-channel commerce methods. More particularly, the disclosure relates to gesture based targeted interactions for cross-channel commerce and other integrated retail experiences.

BACKGROUND

Cross-channel commerce methods are generally known in the art. One such method is Web to Store ("W2S") order fulfillment. A W2S order fulfillment ordinarily includes the following steps. In a typical case, a consumer purchases a product over the Internet through a web-enabled device, such a mobile phone, or a computer. Rather than have the product shipped to the consumer, the consumer chooses to pick up the product at a geographically-convenient retail location. To ensure that only the paying consumer may pick up the product, the consumer might furnish documentation to a representative of the retailer at the retail location, e.g., a purchase order or an invoice that confirms that the consumer purchased the product. Such documentation can be in paper format or in electronic format on a mobile device.

Moreover, gesture based cross-channel retail experiences are generally known in the art. For example, a consumer can use a mobile device to pay for purchases made at a retail location. The consumer taps or otherwise gestures with the mobile device near a reader situated at the point of sale location. Usually, the mobile device then transmits payment to the retailer. In some embodiments, the consumer might receive targeted offers or sales advertisements on the mobile device.

While such exemplary cross-channel commerce methods and systems work for the described purposes, a need exists for improved cross-channel commerce methods and, in particular, for gesture based targeted interactions for cross-channel commerce and other integrated retail experiences.

SUMMARY

While the foregoing provides a general overview of some of the various features and functionalities of the subject invention, a better understanding of the objects, advantages, features, properties and relationships of the subject invention will be obtained from the following detailed description and accompanying drawings which set forth illustrative examples and which are indicative of the various ways in which the principles of the subject invention may be employed.

The present disclosure described herein relates to gesture based targeted interactions for cross-channel commerce and other integrated retail experiences. In one example, a consumer can fulfill a Store Pick Up ("SPU") order, i.e., an order placed by the consumer via computer, mobile device, telephone, fax, mail-order, etc., by gesturing with a mobile device near a digital kiosk and optical sensor at a store pick up location. In another example, the mobile device and/or the digital kiosk displays advertisements, offers and/or product information to the consumer while the consumer completes the SPU order. In a different example, a digital kiosk located in a public area other than a retail location, such as an airport, shopping mall, train station or stadium, displays advertisements, offers, and/or product information to the consumer, and the consumer may transfer such advertisements, offers, and/or product information to the mobile device by gesturing with the mobile device near the digital kiosk.

DETAILED DESCRIPTION

The following description of example methods and apparatuses is not intended to limit the scope of the description to the precise form or forms detailed herein. Instead, the following description is intended to be illustrative so that others may follow its teachings.

Figure 1:
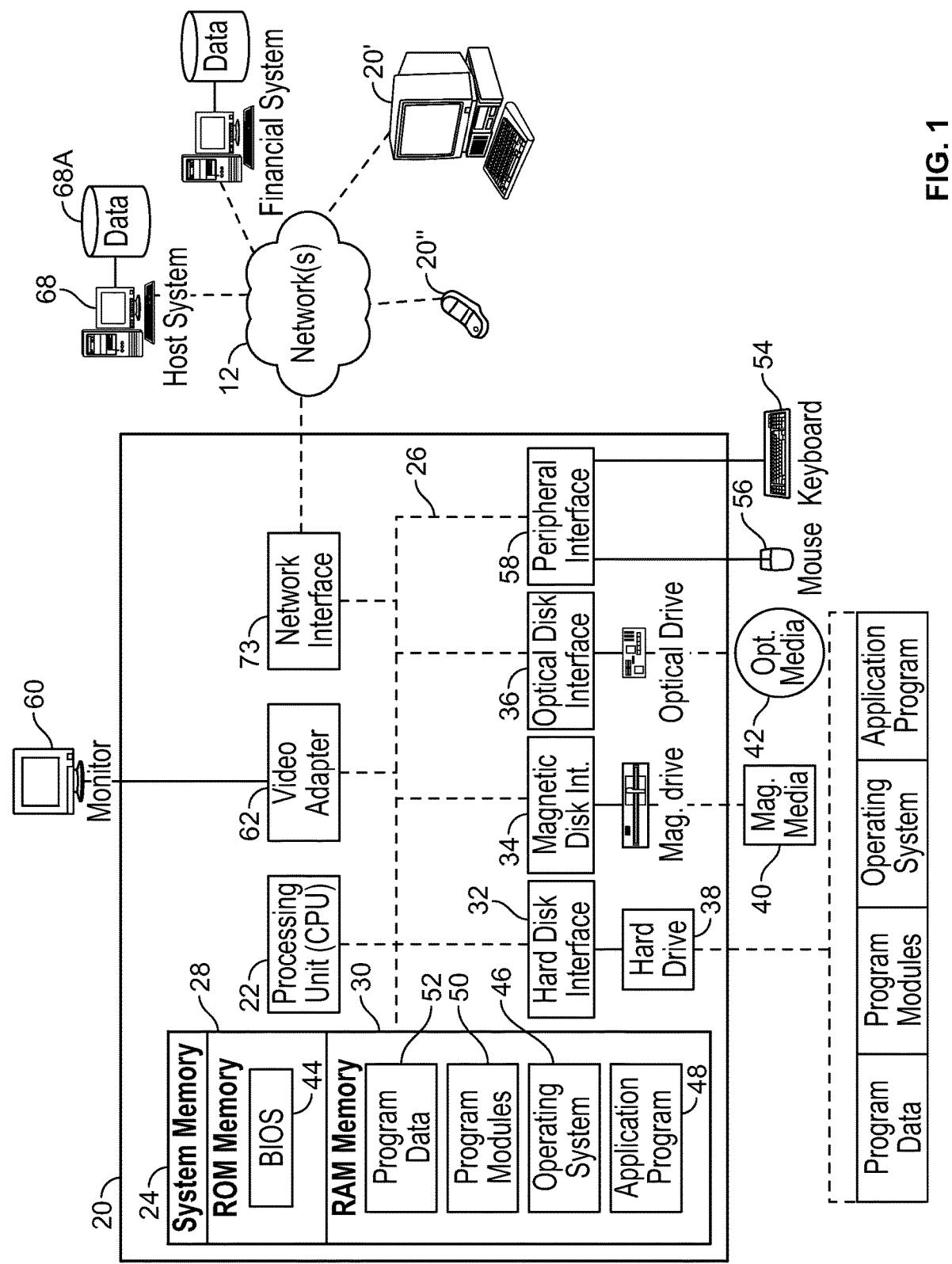
FIG. 1 illustrates, in block diagram form, components of an example computer network environment suitable for implementing the example gesture based targeted interactions for cross-channel commerce and other integrated retail experiences.

To this end, FIG. 1 illustrates a processing device 20, illustrated in the exemplary form of a mobile communication device, a processing device 20', illustrated in the exemplary form of a computer system, and a processing device 20" illustrated in schematic form, such as, for example, an appliance is provided with executable instructions to provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, personal-digital assistant ("PDA"), cellular telephone, tablet, e-reader or the like. Furthermore, while described and illustrated in the context of a single processing device 20, 20', 20", those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read-only memory (ROM) 28 and/or random-access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random-access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed via a network connection, for example.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60 the processing device 20 may also include other peripheral output devices not shown, such as, for example, speakers, cameras, printers, or another suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as the Internet, LAN, MAN, WAN, cellular network, cloud platform, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc. For performing tasks as needed, the host system server 68 may include many or all of the elements described above relative to the processing device 20.

Communications between the processing device 20 and the host system server 68 may be exchanged via a further processing device, such as a network router (not shown) that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
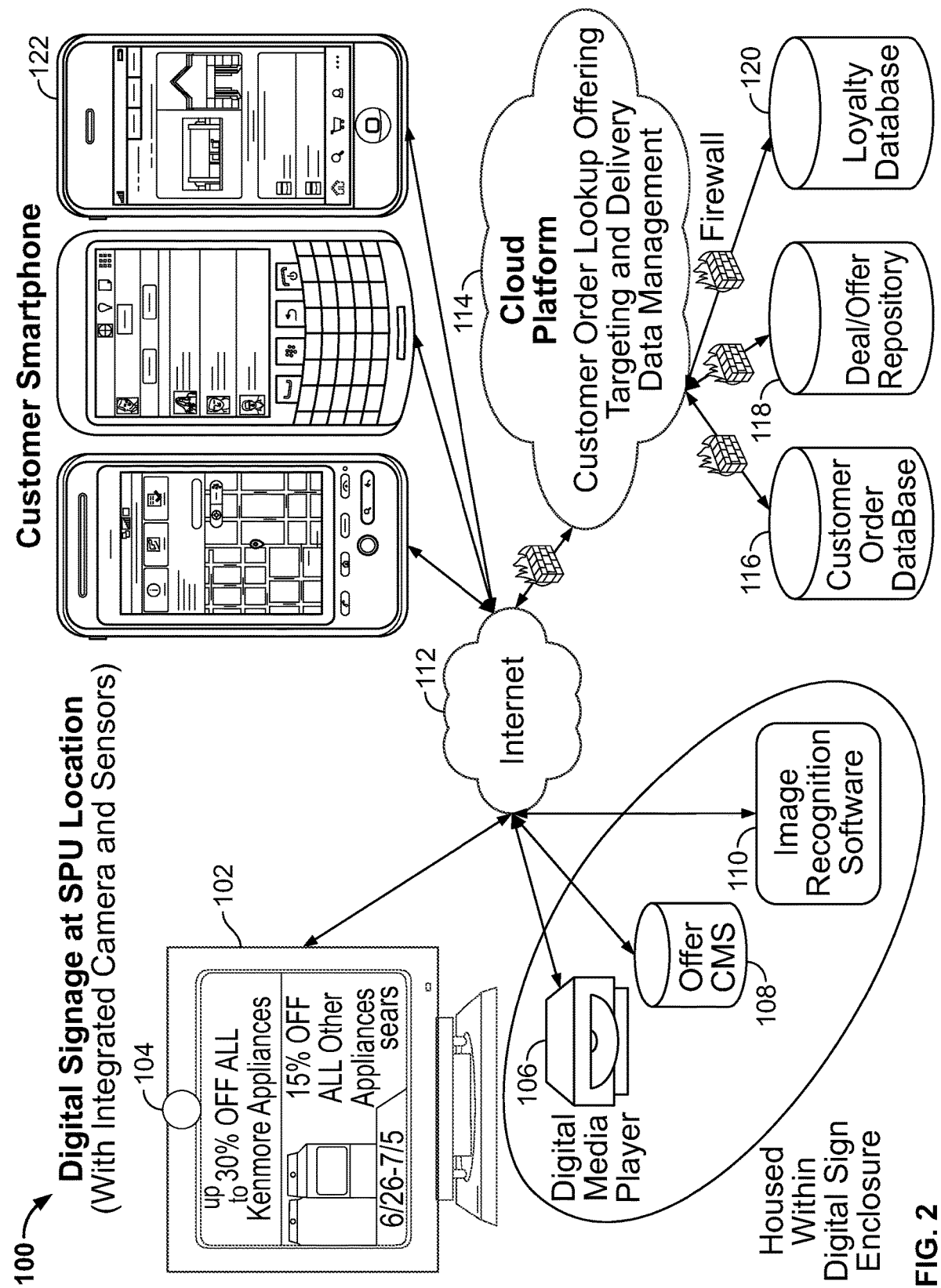
FIG. 2 is a system diagram depicting various components that comprise an example gesture based cross-channel commerce integrated retail system.

FIG. 2 illustrates an example gesture based cross-channel commerce integrated retail system ("system") 100. In this example of the system 100, a consumer purchases a product over the network 12, such as the Internet, through a web-enabled device, such as the mobile phone 122 (similar to the processing device 20) or a computer 20'. The consumer enters a geographically-convenient retail store ("Store Pick-Up location" or "STU location") to retrieve the purchased product. By retrieving the product at the SPU location, the system 100 may increase brick and mortar store traffic.

In this system 100, a digital kiosk 102 may be located at various locations in the SPU location. The digital kiosk 102 may include a display, for example, an LCD television, a plasma television, an LED television, a DLP television, a CRT television and/or any other type of television. It is further contemplated that the digital kiosk 102 may include a non-television monitor or like device having a visual display and/or audio speakers. At least one optical sensor 104, e.g., a camera, etc. is situated on or near the digital kiosk 102. In other example systems, the optical sensor 104 may be integrated into the housing of the digital kiosk 102. The example optical sensor 104 detect a predetermined movement of the mobile device 122 that the consumer performs by waving (or otherwise gesturing) the mobile device 122 near the optical sensor 104 to initiate the store pick up process. In at least one example, the optical sensor 104 are simple off-the-shelf webcams, while in other examples, the optical sensor 104 comprises more sophisticated sensor hardware. The optical sensor 104 may, but need not, work in tandem with associated image recognition software 110 to detect movement of the mobile device 122. The Intel AIM software suite, available from the Intel Corporation located in Santa Clara, Calif., is one example of image recognition software 110 that may work with the example system 100. It will be appreciated by one of ordinary skill in the art, however, that other image recognition software types may be used instead of or in addition to the image recognition software 110.

The example system 100 also includes a digital media player 106 connected to the digital kiosk 102. In this instance, the digital media player 106 is a compact disc player, DVD player, blu-ray player, hard disk drive, flash drive, and/or any other type of non-volatile memory and/or storage device. The digital media player 106 contains media content for display on the digital kiosk 102. The media content includes, but is not limited to, advertisements, recommendations, offers, cross-sells, and/or other product information. For example, the media content might provide a purchase recommendation to the consumer, provide tier a coupon and/or a discount, etc. The media content displayed on a particular digital kiosk 102 at any given time may be tailored to or based on the individual consumer's current SPU order and/or the consumer's purchasing history. For example, if the consumer's current SPU order relates to a portable mp3 player, the media content might relate to headphones and/or a mp3 player carrying case.

As will be understood, the media content may be tailored to or based on the SPU location and hence reflect a geographically local deal to be offered only to consumers located at a particular SPU location. One possible benefit of offering geographically local deals to consumers is that such local deals might help optimize a particular SPU location's inventory. The media content might be tailored to or based on information collected from and provided by the consumer. For example, if the consumer provided information to the retailer indicating that the consumer enjoys watching movies, then the media content may be an advertisement or offer relating to a blu-ray movie. There are countless examples of how the media content might be tailored to or based on information collected from and provided by the consumer, all of which are within the spirit and scope of the present disclosure.

In the example system 100, the digital kiosk 102 is also connected to a content management system ("CMS") 108, which may be hosted on the server 68. The example CMS 108 controls which media content stored on the digital media player 106, if any, is displayed at any given time on the digital kiosk 102. The optical sensor 104, digital media player 106, and the CMS 108 may or may not be housed within the digital kiosk 102.

The example digital kiosk 102 may be connected to a cloud platform 114 (which is one example of the network 12) via the Internet 112 (another example of the network 12). The cloud platform 114 operates as a central location from which the digital kiosk 102, the optical sensor 104, the digital media player 106, and the CMS 108 may be programmed, controlled, or manipulated. Moreover, the cloud platform 114 functions as a central information hub or core in which some or all of the information and data related to an SPU order is managed and processed, or at least flows through. For example, the cloud platform 114 identifies and. verifies SPU orders by interacting with a customer order electronic data repository (e.g., a customer order database 116), which may be hosted on the data repository 68A, to select targeted offers and advertisements, if any, from an electronic data repository (e.g., a deal/offer repository 118), which may also be hosted on the data repository 68A, for display on the display 60, such as the digital kiosk 102 or the mobile device 122, and/or obtains relevant consumer information from a loyalty database 120. For local operations, a local platform may substitute for the cloud platform 114 and the Internet 112.

As previously noted in FIG. 1, in other examples, the cloud platform 114 (or local platform) may be comprised of a different type of server or database, or a series of networked servers and/or databases that house, manipulate, and/or control the relevant data and information needed to implement the system 100.

The mobile device 122 may interact with the system 100 in several different ways. For example, the consumer may perform a predetermined movement (e.g., a wave or a gesture) with the mobile device 122 in the vicinity of the digital kiosk 102 to initiate the SPU process. Performing the predetermined movement is an easy and fun way to initiate the SPU process that may enhance user experience and/or increase customer satisfaction. Moreover, in the example system 100, the mobile device 122 sends data to the cloud platform 114 and receives data from the cloud platform 114, including, for example, information that identifies a consumer's location and store pick up order, store pick up order verification information, consumer profile information, consumer purchase history information and/or data that comprises media content. The system 100 may provide the retailer with an easy way to collect other cross-consumer data in either a real-time or compiled data format. Such data may include the number of digital kiosk interactions over a given time period, the number of coupons, deals or advertisements downloaded from the digital kiosk over a given time period, and/or the number of coupons or deals redeemed during the SPU process over a given time period. Other data types are contemplated and are within the scope of the present disclosure.

In this example, the mobile device 122 communicates with the cloud platform 114 through a Wi-Fi and/or a cellular network. Thus, no additional features, such as Bluetooth, infrared or NFC, are necessary to use the mobile device 122 with the system 100, but it will be understood that any suitable communication system may work in accordance with the system 100. The transmission of data between the mobile device 122 and the cloud platform 114 through Wi-Fi and/or a cellular network may minimize or even negate the need for the consumer to manually enter information into the digital kiosk to initiate the SPU process.

Figure 3:
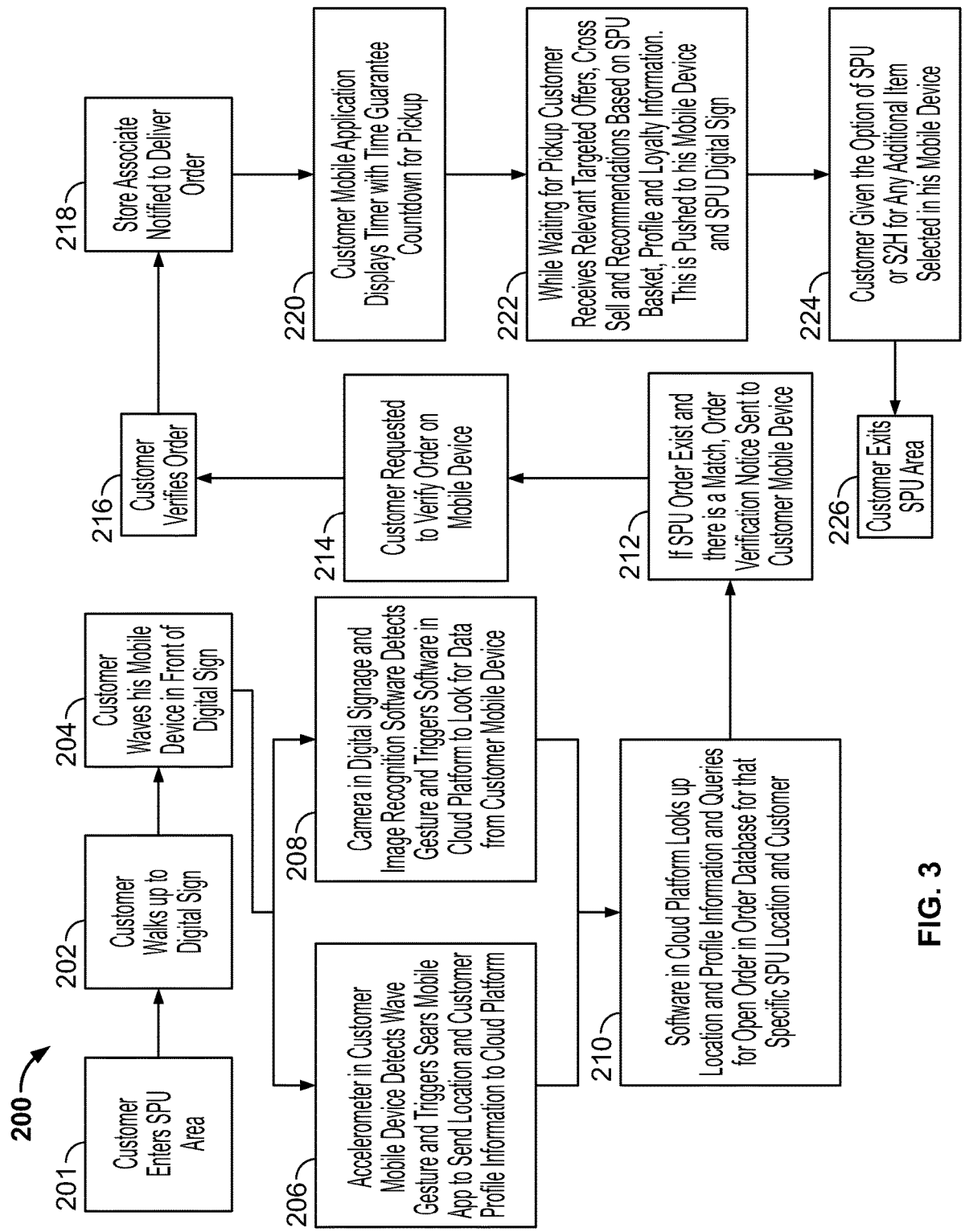
FIG. 3 is a process flow diagram of an example gesture based cross-channel commerce integrated retail system.

FIG. 3 illustrates one example process 200 through which a consumer can complete a W2S purchase, or a store pick up order, using a gesture based cross-channel commerce integrated retail system. At some previous time, the consumer purchases a product over the Internet through a web-enabled device such as a mobile device 122 or a computer 20', over the telephone, via fax, via mail-order, etc., as is well known in the art. In this instance, after purchase, the consumer enters a geographically-convenient retail location (i.e., "Store Pick Up location" or "SPU location") at block 201 with the intent of completing the store pick up order that the consumer previously placed. After entering the SPU location, the consumer may approach the digital kiosk 102 at block 202. The consumer then performs a predetermined movement, e.g., a wave or a gesture, with a mobile device 122 near the front of the digital kiosk 102 at block 204. Any type of predetermined movement is contemplated, including, by way of example only, a wave, a swipe, a circular motion, and/or a tap. Likewise, the predetermined movement may occur in spaces other than near the front of the digital kiosk 102. Additionally, it will be understood that the predetermined movement may occur behind, above, below, in front of, and/or otherwise near the digital kiosk 102.

Next, at block 206, an accelerometer in the mobile device 122 detects the predetermined movement and causes the mobile device 122 to transmit the consumer's profile and/or location information to the cloud platform 114. The transmission of the consumer's profile and/or location information to the cloud platform 114 may be performed by a mobile application residing on the mobile device 122, and/or by any other suitable transmission means. In this example, the mobile device 122 may transmit other information in addition to or instead of the consumer's profile and/or location information to the cloud platform 114, as more fully discussed above. The mobile application and the mobile device 122 transmit this information over the Internet 112 using existing Wi-Fi, cellular network technology, and/or any other suitable connection to the example network 12.

In this example process 200, the execution of block 208 typically occurs at or around the same time as the execution of block 206. At block 208, the optical sensor 104 detects the wave or gesture of the mobile device 122 and trigger the cloud platform 114 to check for incoming consumer profile and/or location information transmitted by the mobile device 122 after the accelerometer of the mobile device 122 detects the predetermined movement.

In some instances, the cloud platform 114 may not receive the consumer profile and/or location information because the mobile device 122 does not have the proper mobile application loaded into memory. Accordingly, if the cloud platform 114 does not receive the consumer profile and/or location information (or other information sent by the mobile device 122), the cloud platform 114 might communicate to the CMS 108 and the digital media player 106 to display a message on the digital kiosk 102 requesting that the consumer download the proper mobile application to the mobile device 122 to complete the SPU order. Accordingly, a purpose of the invention might be to encourage consumers to download particular mobile applications to their mobile devices 122. Alternatively, the digital kiosk 102 may display an audio and/or visual message to the consumer requesting that the consumer manually input information necessary to complete the SPU order into the digital kiosk 102 for transmission to the cloud platform 114.

At block 210, upon receipt of the consumer's profile and/or location information, the cloud platform 114 queries for any open SPU orders pertaining to the consumer currently attempting to complete the SPU order in the SPU location. The cloud platform 114 might attempt to locate information in the consumer order electronic data repository (e.g., customer order database 116) and/or in other databases, servers, and/or memories that comprise the cloud platform 114, and/or network 112. Next, at block 212, if the cloud platform identifies an SPU order for the consumer, then the cloud platform 114 transmits an order verification notice for receipt by the consumer on the mobile device 122. Once the mobile device 122 receives the order verification notice, the consumer is asked to verify the SPU order at block 214. The order verification notice might take the form of a particular graphical user interface that is part of a mobile application stored on the mobile device 122. Alternatively, the order verification notice might be an email transmitted to the consumer, a phone call received by the mobile device 122, or a text message received by the mobile device 122, and/or any other suitable messaging notification. In this manner, the SPU order identification and verification processes may prevent accidental triggering of SPU order pick ups when the consumer is not ready to and/or did not intend to initiate the SPU process. The SPU order identification and verification processes may also add a security component to the transaction.

Regardless of the form of the order verification notice, once the consumer verifies the SPU order at block 216, the cloud platform 114 transmits a notification the SPU location authorizing delivery of the purchased product to the consumer at block 218. The cloud platform 114 may, but need not, transmit the notification to a computer system of the SPU location. In other embodiments, the cloud platform in 114 does not send an order verification notice, but instead, the cloud platform 114 may simply notify the retail store associated with the SPU location to deliver the purchased product to a particular consumer. At block 220 of example process 200, the mobile device 122 displays a countdown timer guaranteeing delivery of the purchased product to the consumer before the timer counts down to zero. As will be appreciated, other example processes within the scope of the present disclosure may or may not have such a countdown timer or similar feature.

Next, at block 222, the consumer may view advertisements, product offers, cross-sells, recommendations, and/or other media content on the mobile device 122 and/or the digital kiosk 102 while waiting to receive the purchased product. For instance, such advertisements, product offers, cross-sells, recommendations, and/or other media content may be tailored to or based on the individual consumer's current SPU order and/or the consumer's purchasing history. The media content on display on the mobile device 122 and/or the digital kiosk 102 might be based on specific information collected from and provided by the consumer that is stored in the cloud platform 114. In particular, the information collected from and provided by the consumer might be stored in the customer order electronic data repository (e.g., customer order database 116) or the loyalty database 120. Based on the information contained in the customer order electronic data repository (e.g., customer order database 116), the loyalty database 120, and/or in other databases, servers, and/or memories of the cloud platform 114, the cloud platform 114 might transmit particular media content stored in the electronic data repository (e.g., deal/offer repository 118) via the Internet 112 to the digital media player 106 for display on the digital kiosk 102 and/or to the mobile device 122 via the Internet 112. In this way, the process 200 might increase revenue and/or revenue-per-consumer.

Should the consumer wish to make an additional product purchase at this time, the consumer may place a new SPU order (to be completed at the same time as the initial SPU order) at block 224. Alternatively, the consumer can choose to have the additional products shipped directly to the consumer's home or other desired street address.

Finally, at block 226, a store associate delivers the purchased product to the consumer, and the consumer leaves the SPU location, thereby completing example process 200. Delivery may be had through alternative means, e.g., a conveyor belt located near the store pick up location. Example process 200 minimizes interaction between store associates and the consumer, although additional interaction might occur in other related processes that are still within the scope of the subjection invention.

Figure 4A:
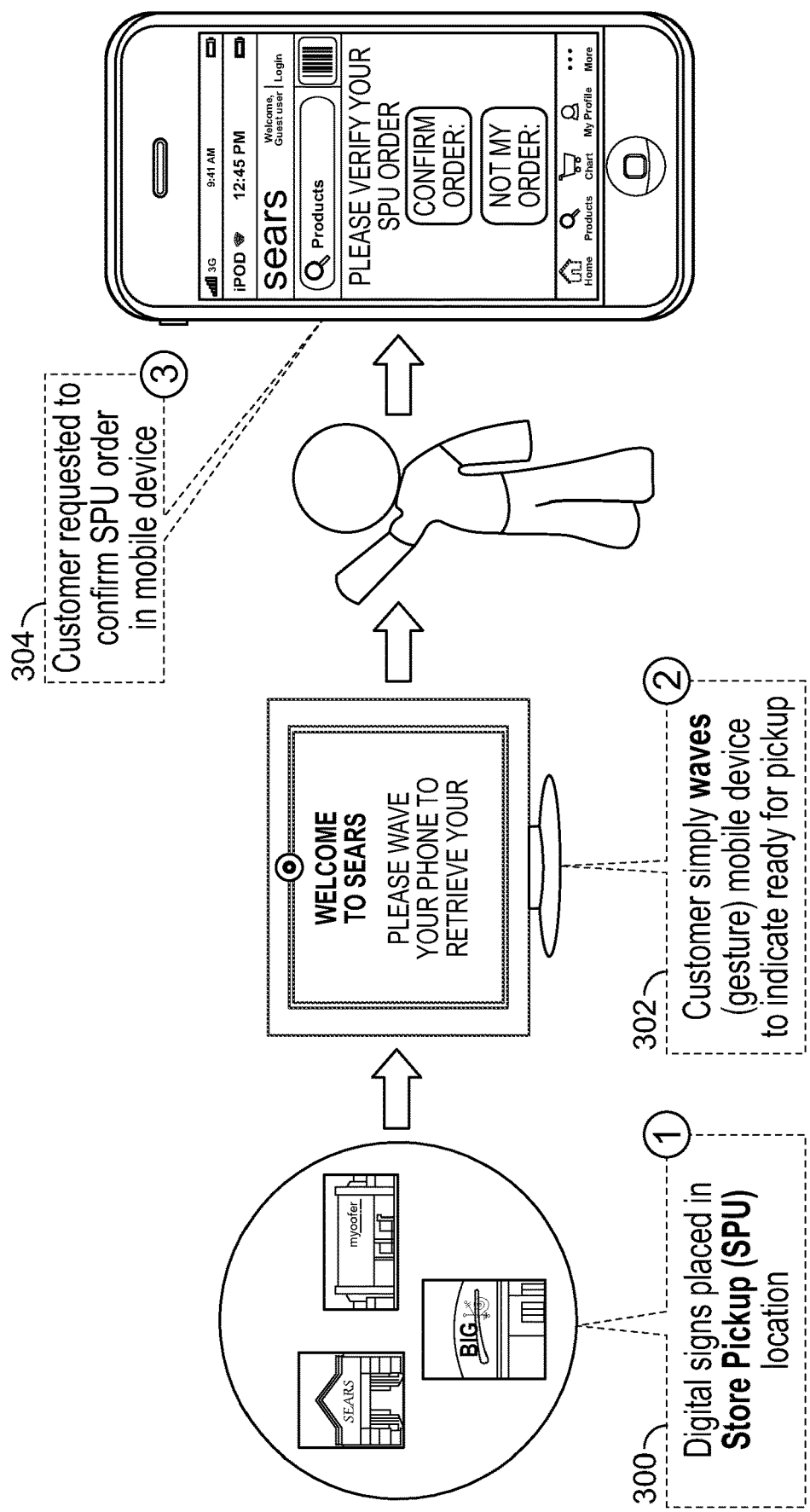
FIG. 4A is a diagram describing an example gesture based cross-channel commerce integrated retail experience from a consumer's perspective.
Figure 4B:
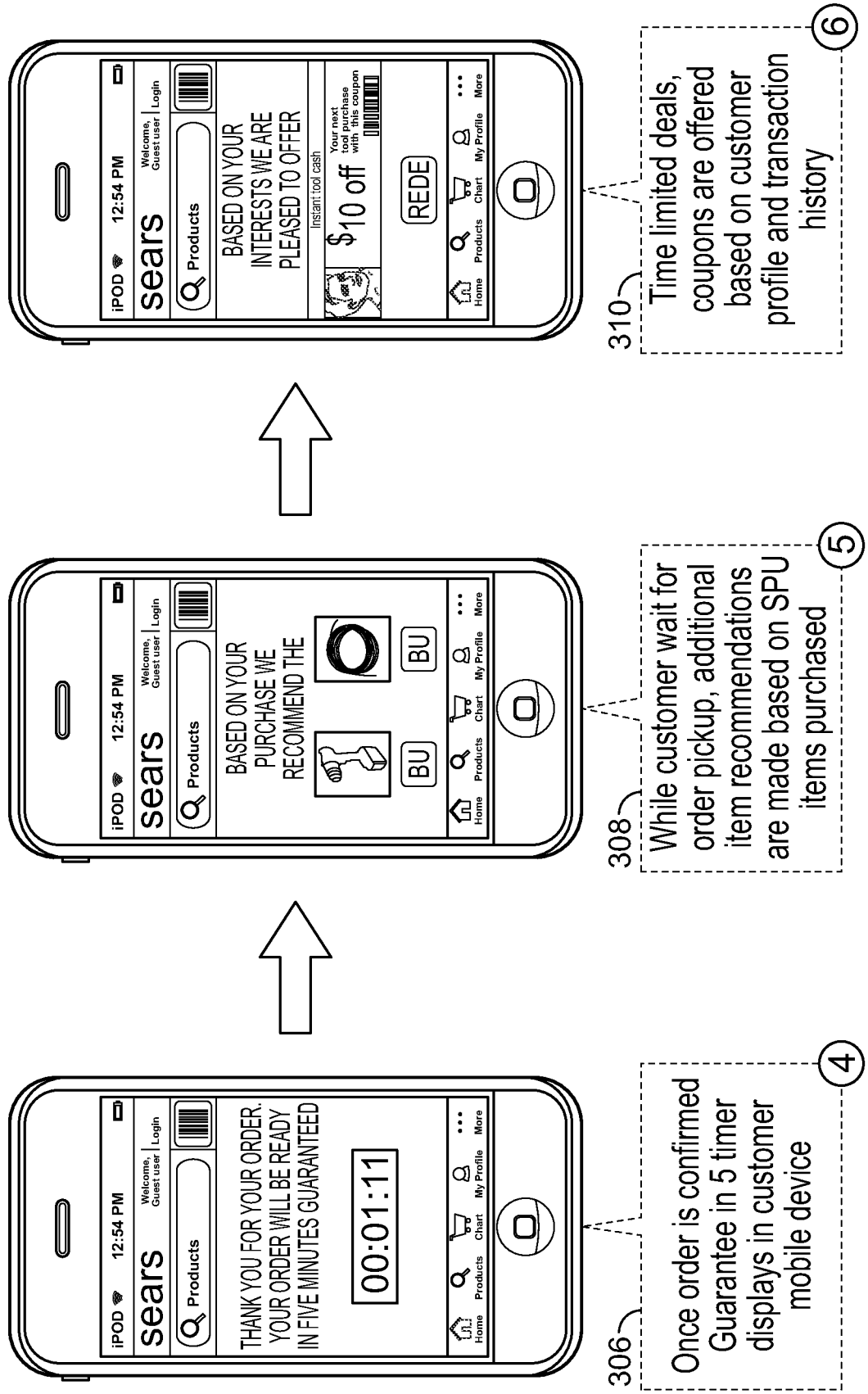
FIG. 4B is a diagram describing an example gesture based cross-channel commerce integrated retail experience from a consumer's perspective.

FIG. 4 describes example process 200 from the consumer's perspective. First, at block 300, the consumer locates a digital kiosk 102 at a SPU location. Second, at block 302, the consumer performs a predetermined movement (e.g., a wave or a gesture) with the mobile device 122 near the digital kiosk 102 (and/or the optical sensor 104) to indicate that the consumer is ready to complete the SPU order. Third, at block 304, the mobile device 122 receives an order verification notice, requesting that the consumer verify the SPU order. Fourth, at block 306, the mobile device 122 receives confirmation that the purchased product will be ready (delivered) in a pre-determined amount of time (e.g., five minutes or less). Fifth, at block 308, the mobile device 122 receives media content, including additional item recommendations, for review by the consumer while waiting to pick up the purchased product. Such additional item recommendations may be tailored to or based on the consumer's SPU order. Sixth, at block 310, the mobile device 122 displays time-limited deals and/or coupons (based on the consumer's purchasing history, and/or information collected from and supplied by the consumer) for the consumer's review. The type of information presented to the consumer at blocks 308 and 310 on the mobile device 122 are not limited to those described herein. Likewise, the graphical user interfaces appearing on the mobile device 122 and the resulting consumer experience may deviate from that described in FIG. 4 and still be within the spirit and scope of the present disclosure.

In an alternative embodiment, the digital kiosk 102 is placed in a public area other than at a SPU location, such as an airport, shopping mall, train station, or stadium. The digital kiosk 102 that is placed in a non-SPU location functions much like the digital kiosk 102 placed in a SPU location in that it can display media content, e.g., advertisements, offers, cross-sells, recommendations, product information, etc. for viewing by a consumer. Such media content may be tailored to or based on the individual consumer's current purchase, purchasing history and/or specific information collected from and provided by the consumer that is stored in the cloud platform 114 or on the mobile device 122. The consumer can download desired media content to the mobile device 122. The consumer can then redeem or apply any offers, deals, or coupons downloaded to the mobile device 122 at a later time in a retail store, over the Internet 112 or through a mobile application stored on the mobile device 122.

In this example embodiment, the process through which the consumer ultimately downloads media content to the mobile device 122 is similar to process 200, described above, except for the fact that there is no SPU order to complete when the digital kiosk 102 is located in a public area other than at a retailer SPU location.

Although certain example processes and systems have been described herein, the scope of coverage of this patent is not limited thereto. On the contrary, this patent covers all processes and systems fairly falling within the scope of the appended claims either literally or under the doctrine of equivalents.

What is claimed is:

1. A method, comprising:
via a network comprising a mobile device and a digital kiosk:
receiving, via a network that includes a cloud platform, media content for display on the digital kiosk, wherein:
the media content displayed on the digital kiosk is based on a store pick-up location and a consumer profile, wherein the consumer profile comprises a purchased product being picked up, and
the media content comprises advertisements, product information and a coupon;
causing the mobile device to transmit the consumer profile to the cloud platform according to a detection, via an accelerometer of the mobile device, of a wave of the mobile device;
triggering, in response to the causing of the mobile device to transmit the consumer profile to the cloud platform, the cloud platform to check for the consumer profile according to a detection, via a camera of the digital kiosk, of the wave of the mobile device;
displaying a message on the digital kiosk that an application needs to be loaded, if the cloud platform does not receive the consumer profile;
selectively transferring the media content, from the digital kiosk to the mobile device, while the store pick-up order is being completed; and
verifying a consumer via the mobile device, thereby:
causing a transmission, from the network, a notification to a particular location authorizing delivery of the purchased product to the consumer; and
causing the purchased product to be delivered to the particular location without any manual entry of information on the digital kiosk.

2. The method according to claim 1, comprising:
detecting, via the digital kiosk in the particular location, a predetermined movement of the mobile device.

3. The method according to claim 2, wherein:
detecting the predetermined movement of the mobile device comprises detecting, via an optical sensor or a camera of the digital kiosk.

4. The method according to claim 1, comprising:
notifying a cloud platform, via the digital kiosk and a communication link, regarding a movement of the mobile device.

5. The method according to claim 1, comprising:
detecting, via the mobile device, a predetermined movement of the mobile device.

6. The method according to claim 5, comprising:
in response to detecting, via the mobile device, the predetermined movement of the mobile device, sending user information stored on the mobile device to the cloud platform via a communication link.

7. The method according to claim 6, wherein the communication link does not include the digital kiosk.

8. The method according to claim 5, comprising:
in response to detecting, via the mobile device, the predetermined movement of the mobile device, sending location information to the cloud platform via a communication link.

9. The method according to claim 8, wherein the communication link does not include the digital kiosk.

10. The method according to claim 1, comprising collecting, via the network, cross-user data.

11. The method according to claim 1, wherein the digital kiosk comprises one or more displays, one or more speakers, and one or more optical sensors.

12. The method according to claim 1, comprising providing a digital media player system that stores media content for display on the digital kiosk.

13. The method according to claim 12, comprising controlling, via a content management system, which media content stored on the digital media player system is displayed on the digital kiosk.

14. The method according to claim 1, comprising sending, via the network, an order verification notice to the mobile device.

15. The method according to claim 1, wherein the network comprises a user order data repository.

16. The method according to claim 1, wherein the network comprises a data repository for storing one or both of a deal and an offer.

17. The method according to claim 1, wherein the network comprises a loyalty database.

18. The method according to claim 1, wherein the media content is customized for the user that placed the order.

19. The method according to claim 1, comprising:
   identifying, via the cloud platform, an order;
   verifying, via the cloud platform, the order;
   providing, via the cloud platform, targeted offers or advertisements; and
   retrieving relevant user information from a loyalty database.

* * * * *